(12) United States Patent
Regan

(10) Patent No.: US 8,809,748 B2
(45) Date of Patent: Aug. 19, 2014

(54) APPARATUS AND METHOD FOR POST HEAT TREATING PIPE OR WELD JOINTS

(76) Inventor: Colin Regan, Wabamum (CA)

( * ) Notice: Subject to any disclaimer, the term of this patent is extended or adjusted under 35 U.S.C. 154(b) by 683 days.

(21) Appl. No.: 13/052,168

(22) Filed: Mar. 21, 2011

(65) Prior Publication Data

US 2011/0253702 A1  Oct. 20, 2011

Related U.S. Application Data

(63) Continuation-in-part of application No. 11/773,559, filed on Jul. 5, 2007, now Pat. No. 7,935,915, which is a continuation-in-part of application No. 10/709,595, filed on May 17, 2004, now Pat. No. 7,256,374.

(51) Int. Cl.
*H05B 1/02* (2006.01)
*H05B 3/58* (2006.01)

(52) U.S. Cl.
CPC .................................. *H05B 3/58* (2013.01)
USPC ........... 219/482; 219/506; 219/494; 228/231; 228/232

(58) Field of Classification Search
CPC ............... H05B 1/02; H05B 3/42; H05B 3/58
USPC ................. 219/482, 494, 506, 535, 531, 633; 228/231, 155, 232
See application file for complete search history.

(56) References Cited

U.S. PATENT DOCUMENTS

| 4,329,569 | A  | * | 5/1982  | Hjortsberg et al. | 219/535 |
|-----------|----|---|---------|-------------------|---------|
| 5,721,413 | A  | * | 2/1998  | Moe               | 219/61.2 |
| 6,054,691 | A  | * | 4/2000  | McGwire           | 219/535 |
| 6,953,917 | B2 | * | 10/2005 | Chenault          | 219/497 |
| 7,015,421 | B2 | * | 3/2006  | Nakagawa          | 219/243 |
| 7,064,300 | B1 | * | 6/2006  | Emerson           | 219/535 |
| 7,203,419 | B2 | * | 4/2007  | Malone et al.     | 392/468 |
| 7,474,221 | B2 | * | 1/2009  | Den Boer et al.   | 340/572.8 |
| 8,399,813 | B2 | * | 3/2013  | Gillanders        | 219/533 |
| 2002/0008101 | A1 | * | 1/2002 | Hauschulz        | 219/494 |

* cited by examiner

*Primary Examiner* — Mark Paschall
(74) *Attorney, Agent, or Firm* — J. Jay Haugen; William J. Bundren

(57) ABSTRACT

An apparatus and method for heating a pipe prior to performing a welding operation, an interpass welding operation, a hydrogen bake-out operation of a weld joint or for post heat-treating of a weld joint is provided. The heating apparatus can include at least one heating collar placed around a pipe or weld joint, and a controller unit for controlling the thermal heat energy transferred from the heating collar to the pipe or weld joint.

25 Claims, 11 Drawing Sheets

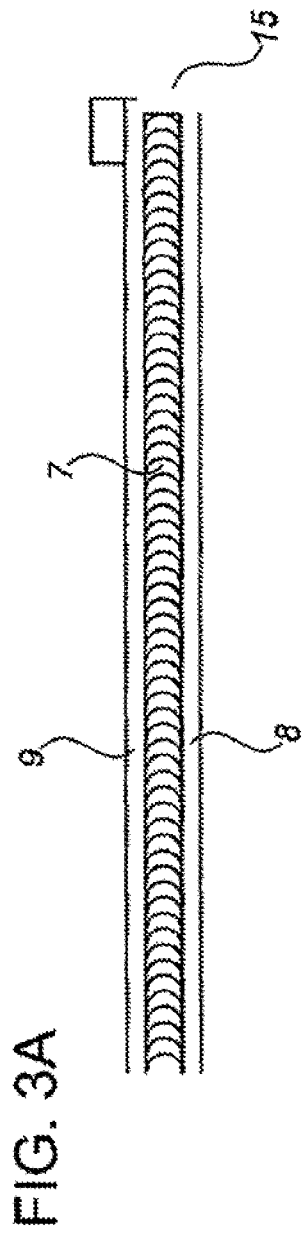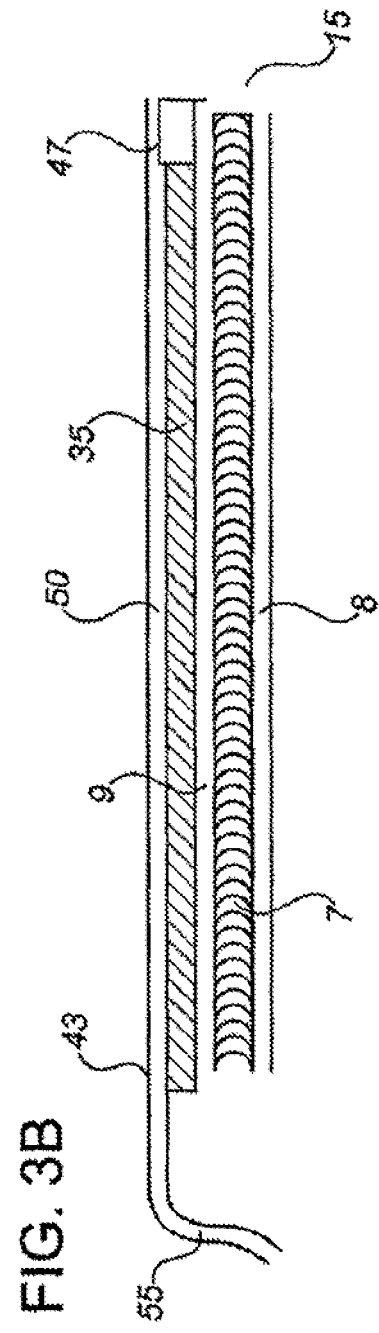

APPARATUS AND METHOD FOR POST HEAT TREATING PIPE OR WELD JOINTS

CROSS-REFERENCE TO RELATED APPLICATIONS

This application is a continuation-in-part application of U.S. application Ser. No. 11/773,559 filed on Jul. 5, 2007, which is a continuation-in-part application of U.S. application Ser. No. 10/709,595 filed on May 17, 2004, now U.S. Pat. No. 7,256,374, and this application hereby incorporates these documents by reference herein in their entirety.

TECHNICAL FIELD

The present invention relates to a heating device for preheating sections of piping before performing a welding operation, an interpass welding operation, a hydrogen bake-out of the weld or a post heat-treating of the weld. In particular, the present invention relates to heating collars placed on each pipe adjacent to the weld joint.

BACKGROUND

For the purposes of this specification, the terms set out below are defined as follows.

The term "post weld treatment heating" refers to the operation of post weld heating a section of pipe to the desired temperature after performing a welding operation upon a section of pipe. For example, in a post weld heating operation using P91 chrome-moly steel pipe, the pipe is heated to a temperature range between 200-1015 degrees Fahrenheit. The term "P91" is used to describe a common type of pipe used in a high-pressure application for transporting oil, gas, or steam. P91 is comprised of a chromium-molybdenum alloy having the chemical composition of 9Cr-1Mo—V (P91).

The term "hydrogen bake-out" refers to a finishing operation on a weld whereby a welded section of pipe in-situ is held at a constant temperature in order to remove any hydrogen impurities from the weld in preparation for a cutting or welding operation. A hydrogen bake-out helps prevent the weld-joint from pre-mature fracturing of the weld-joint or pipe in-situ.

The term "interpass temperature" refers to the temperature of the pipe between welding passes. A "welding pass" is the path taken by a single welding operation. For example, a welding pass for a section of pipe is the circumferential path taken around a weld joint for the pipe.

Many of the prior art inventions for heating pipe are difficult and cumbersome to apply, remove or relocate from the weld area, which typically may be held within a tightly confined area. Additionally, many of the prior art inventions require a power source requiring the use of heavy machinery to provide a suitable source of power. For example, a generator truck is typically required for voltage requirements exceeding 480-600 volts. Each truck uses heavy cabling to supply power from the generator mounted on the truck to the heating apparatus, which is typically located in a remote location from the weld site. The heavy cabling may present a hazard at the work site since the use of heavy voltage cabling present a safety hazard.

It is, therefore, desirable, to provide a portable heating apparatus for heat treating a section of oilfield pipe that is easy to use and that does not pose a worksite safety hazard.

SUMMARY

An apparatus and method is provided for heating sections of pipe or piping prior to welding the pipe sections together, for heating a weld joint prior to performing an interpass welding operation, for heating a weld joint to perform a hydrogen bake-out operation and/or for post heat-treating of the weld joint.

In some embodiments, the heating device can comprise a collar that can be releasably attached to a pipe. The device can comprise electric heating elements disposed within the collar. In other embodiments, the device can comprise a programmable temperature controller to provide means to heat a pipe to a desired temperature.

In some embodiments, the collar can be secured around a pipe using straps and D-rings. In other embodiments, the collar can be closed using a spring-loaded button that latches with a receptacle. In further embodiments, the collar can be closed using a thumb-catch or a briefcase-style latch. In yet other embodiments, the collar can be closed using a lynch pin passing through loops disposed on both upper and lower portions of the collar.

In some embodiments, the device can comprise a programmable temperature controller operating a program configured to control the electrical power supplied to a collar wherein the heating of a pipe or weld joint can follow a user-defined heating program that can control the duration of the heating operation in addition to setting a desired heating temperature at any point of time during the heating operation.

In other embodiments, the device can further comprise a temperature thermocouple or sensor disposed in a heating collar, and a data logger to monitor and log the temperature of the pipe or weld joint during a heating operation of the pipe or weld joint. In further embodiments, the data logger can be configured to transfer the logged data to a general purpose computer for creating electronic records of the heating operations monitored and logged by the data logger.

Broadly stated, in some embodiments, an apparatus for heating a pipe or weld joint is provided, comprising: at least one heating collar configured for being disposed around the pipe or weld joint; a controller unit configured for connecting to a source of electrical power, the controller unit operatively coupled to the at least one heating collar and further configured for controlling the supply of electrical power to at least one heating collar; a contactor disposed in the controller unit for controlling the supply of electrical power to the at least one heating collar; and a digital controller disposed in the controller unit configured for turning the contactor on and off, the digital controller further comprising a program for turning the contactor on and off at predetermined times wherein the at least one heating collar can heat the pipe or weld joint at the predetermined times.

Broadly stated, in some embodiments, a method for heating a pipe or weld joint is provided, the method comprising the steps of: providing a heating apparatus, comprising: at least one heating collar configured for being disposed around the pipe or weld joint, a controller unit configured for connecting to a source of electrical power, the controller unit operatively coupled to the at least one heating collar and further configured for controlling the supply of electrical power to at least one heating collar, a contactor disposed in the controller unit for controlling the supply of electrical power to the at least one heating collar, and a digital controller disposed in the controller unit configured for turning the contactor on and off, the digital controller further comprising a program for turning the contactor on and off at predetermined times wherein the at least one heating collar can heat the pipe or weld joint at the predetermined times; placing the heating apparatus around the pipe or weld joint; connecting the heating apparatus to the source of electrical power; and turning on the heating apparatus wherein the pipe or weld joint is heated.

BRIEF DESCRIPTION OF THE DRAWINGS

FIG. 3A is a cross-sectional view depicting a heating collar including the heating apparatus of FIG. 1.

FIG. 3B is a cross-sectional view depicting the heating collar of FIG. 3A with fastening means.

DETAILED DESCRIPTION OF EMBODIMENTS

An apparatus and method for heat-treating pipe or weld joints is provided.

Figure 1:
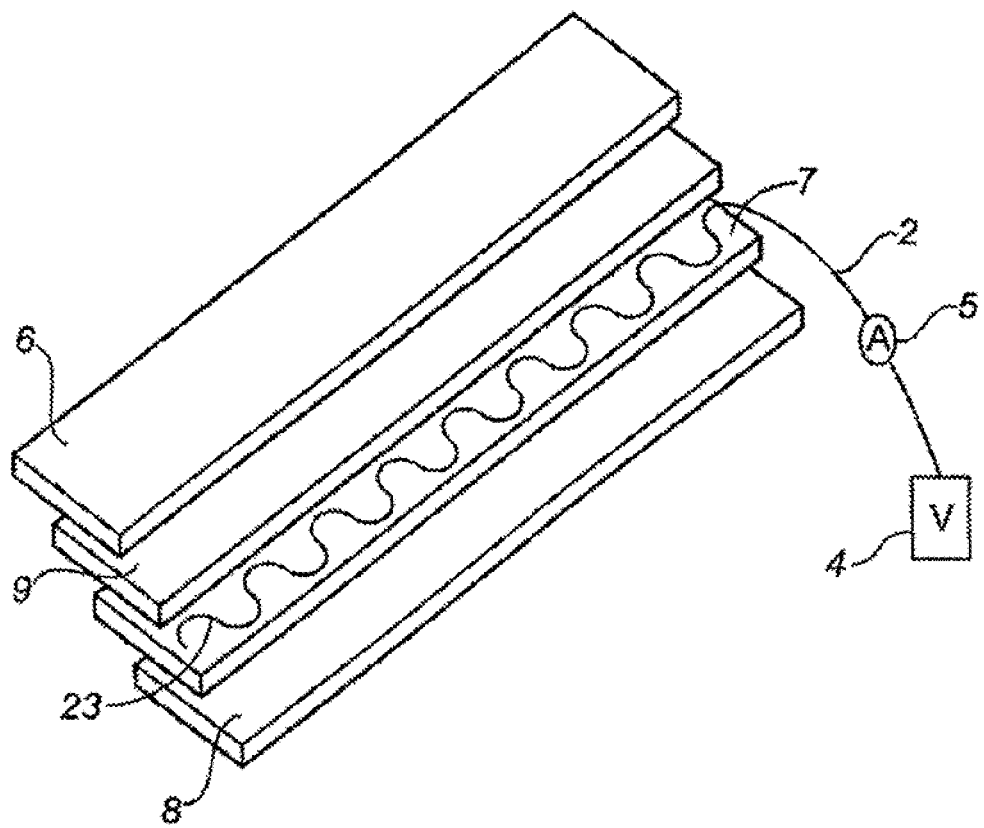
FIG. 1 is an exploded perspective view depicting a general embodiment of a heating apparatus of a heating collar.

Referring to FIG. 1, an embodiment of heating apparatus 10 is shown. In a general aspect, heating apparatus 10 can comprise thermally conductive heating element 2, power source 4, and programmable temperature control mechanism 5 for controlling the voltage and current supplied to heating element 2.

Heating element 2 can comprise resistive wire heating element 23. Wire heating element 23 can provide a mechanism for transferring electrical potential energy into thermal energy. Accordingly, heating element 2 can further comprise thermally conductive inner core 7 for absorbing, containing, and transferring thermal energy from wire heating element 23 to heat transfer medium 8. In some embodiments, heat transfer medium 8 can be contiguous with inner core 7. Heat transfer medium 8 can absorb thermal energy from inner core 7 and transfer the thermal energy absorbed from inner core 7 to the surface of the metal piping when apparatus 10 is wrapped around a pipe to be heat-treated. Heat transfer medium 8 can comprise a thermally conductive substrate, such as metal, to provide an inner liner for covering and protecting inner core 7 from damage.

In some embodiments, inner core 7 can be covered by outer cover shell or layer 9, which can support heating element 23 and protect heating element 23 from direct contact with the welding operator. Outer layer 9 can be covered by thermally non-conductive cover 6 for protecting the hand of the welding operator from direct contact with heating element 23. In some embodiments, heating apparatus 10 can further comprise an insulated blanket (not shown) to cover up to 6" of pipe on both sides of heating apparatus 10 plus the apparatus itself.

An exploded view of the spatial relationship of heating element 23, inner core 7, heat transfer medium 8, outer layer 9, and cover 6 is shown in FIG. 1. Inner core 7 can be sandwiched between heat transfer medium 8 and outer layer 9. Heating element 23 can be supported by inner core 7 and can be contiguous with both transfer medium 8 and outer layer 9. Cover 6 can provide a protective "wrapper" for the "sandwich".

For the purposes of this specification and the claims contained herein, the term "contiguous" is used to mean that inner core 7, transfer medium 8, and outer layer 9 can be situated in combination so as to be in contact with each other. The greater the surface area of inner core 7 that is in contact with the surface area of transfer medium 8, the greater the thermal energy transfer that can occur between inner core 7 and transfer medium 8.

It should be apparent to one skilled in the art that inner core 7, transfer medium 8 and outer layer 9 can be of any suitable physical configuration so long as inner core 7 is sandwiched between transfer medium 8 and outer layer 9 with no gaps therebetween in order to enable the heating functionality of apparatus 10.

Figure 2A:
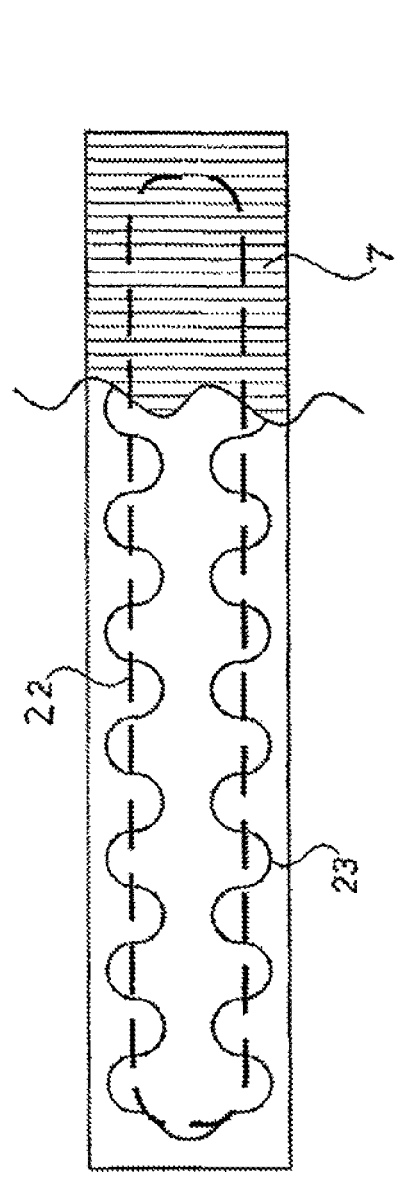
FIG. 2A is a top plan cutaway view depicting the inner core of the heating apparatus of FIG. 1.

A cutaway view of a heating collar is shown in FIG. 2A. Each collar can comprise inner core 7. Inner core 7 can be heated by induction by heating element 22. Heating element 22 can comprise coil wire heating element 23. In some embodiments, wire heating element 23 can comprise a high resistance wire that can provide a heat source to inner core 7 when an electrical current passes through heating element 23.

In some embodiments, inner core 7 can comprise a ceramic material, as well known to those skilled in the art. Ceramic material can be used for inner core 7 because of the thermal ability of ceramic material to efficiently absorb, retain, and transfer heat directly from the heating element to the weld site. It should be obvious to those skilled in the art, however, that inner core 7 can comprise any suitable material for absorbing, retaining and transferring heat. As required by the pre-welding operation, a method is required for consistently controlling a welding parameter such as temperature.

Ceramic inner core 7 can provide a consistent heat source for the piping since the flow and transfer of heat from inner core 7 to the piping can be controlled by thermostatic control mechanism 5 as shown in FIG. 1. In some embodiments, inner core 7 can be heated to a specific temperature by controlling the voltage and current applied to wire heating element 23. Conversely, inner core 7 can easily be cooled down to a specific temperature by controlling the voltage and current applied to wire heating element 23.

Figure 2B:
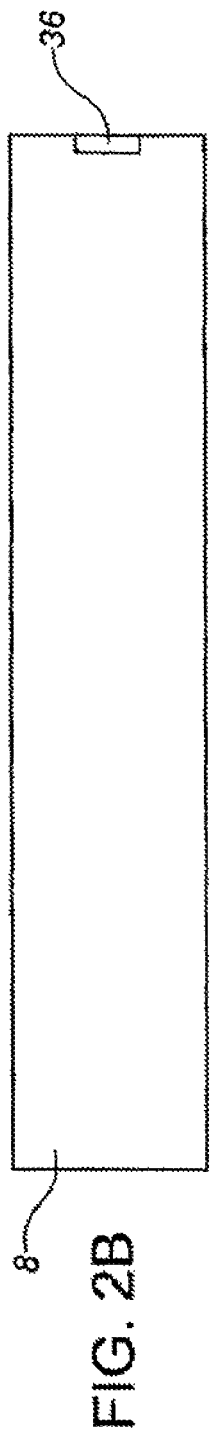
FIG. 2B is a top plan view depicting the heat transfer element of the heating apparatus of FIG. 1.

The heating collars of apparatus 10 can further comprise heat transfer medium 8 as shown in FIG. 2B. Heat transfer medium 8 can provide a thermally conductive material for transferring thermal energy from inner core 7. Heat transfer medium 8 can be capable of transferring thermal energy from inner core 7 to metal piping that is to be heat-treated. Additionally, heat transfer medium 8 can include opening 36 formed on the surface of heating transfer medium 8 for housing control mechanism 5 as shown in FIG. 1.

In some embodiments, heat transfer medium 8 can be made of galvanized sheet metal. The sheet metal can provide an efficient heat transfer substrate and can be formed into the desired shape of the piping.

Figure 2C:
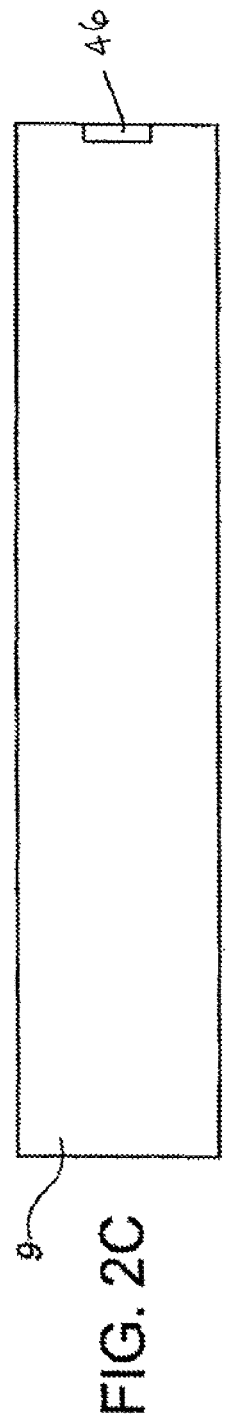
FIG. 2C is a top plan view depicting the outer cover of the heating apparatus of FIG. 1.

The heating collars of apparatus 10 can further comprise outer layer 9 as shown in FIG. 2C. Outer layer 9 can also provide a protective outer covering for housing heating element 22, ceramic inner core 7 and heat transfer medium 8. Outer layer 9 can provide a safety barrier to help protect the hands of the welding operator from direct contact with heating element 22. Additionally, outer layer 9 can include housing 46 for holding the wiring (not shown) and programmable temperature control mechanism 5 as shown in FIG. 1.

Referring to FIGS. 3A and 3B, a cross-sectional view of heating collar 15 is shown. In some embodiments, inner core 7 can be spaced substantially parallel and contiguous between transfer medium 8 and outer layer 9. Additionally, to protect the hands of the welding operator from direct contact with the heating element, protective layer 35 can be provided on top of outer layer 9. Protective layer 35 can comprise a heat insulating substance. In some embodiments, the heating insulating substance can comprise Fibrafrax™ insulation, as manufactured by Plibrico of Chicago, Ill., U.S.A. Fibrafrax™ insulation is fire retardant, and, therefore, does not degrade under high temperature, which can make it suitable as an insulator for the heating collar application.

In other embodiments, collar 15 can further comprise outer housing 50 that can terminate with fastening means 55. Fastening means 55 can provide a mechanism for securing the collar around the piping. In some embodiments, fastening means 55 can comprise a Velcro™ portion that extends beyond first end 43 of outer housing 50. Fastening means 55 can further comprise second end 47 on outer housing 50. Second end 47 can attach to a portion of first end 43 thereby securing the heating collar around the piping.

For the purposes of this specification, the term "distal end" refers to first end 43 on outer housing 50. Similarly, the term "proximal end" refers to second end 47 on outer housing 50. In some embodiments, the distal end and the proximal end of each collar are located at each of the opposed ends of the collar. However, it is contemplated that first end 43 and second end 47 of fastening means 55 can be located anywhere along the length of outer housing 50.

It will be apparent to one skilled in the art that the scale and proportions of each heating collar can be adjusted to accommodate various dimensions of piping. For example, the circumferential length or diameter ("x") of the collar can be adjusted to accommodate various diameters of piping. Additionally, the width ("y") of the collar can be adjusted to provide a greater heating surface area on the piping and, additionally, to comply with regulatory standards with respect to heat treating and stress relieving of pipe welds.

It should be obvious to those skilled in the art that any geometry for fastening means 55 can be used. For example, the length of first end 43 can be adjusted to secure around various dimensions of piping. Additionally, second end 47 can also be adjusted to accommodate the modulated dimension of the first end. For example, a longer Velcro tab for first end 43 can be provided to accommodate larger dimensions of piping. Also, a greater Velcro fastening area for second end 47 can be provided to accommodate first end 43. In this way, the heating collar can be adjustable to accommodate a wide range of piping diameters.

Figure 4:
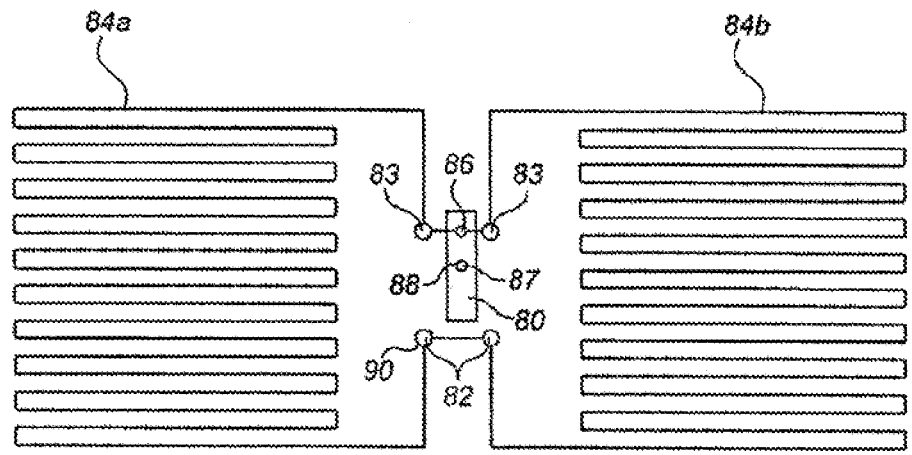
FIG. 4 is an electrical schematic depicting the electrical circuitry of an embodiment of a heating collar.

Referring to FIG. 4, an electrical schematic is shown that represents the electrical circuitry of some embodiments of the apparatus described herein. Heating coils 84a and 84b represent the heating elements disposed within the heating collars and can be connected to connector terminals 82 and 83. Power line neutral 90 from an electrical power source (not shown) can be coupled to terminal 82. In some embodiments, the electric circuit can comprise thermostat 80. In such embodiments, terminals 83 can be coupled to terminal 86 on thermostat 80. Power line 88 from the electrical power source can be coupled to terminal 87 on thermostat 80. In other embodiments, the electric circuit can omit thermostat 80 wherein the source of electrical can be coupled to terminals 83.

Figure 5:
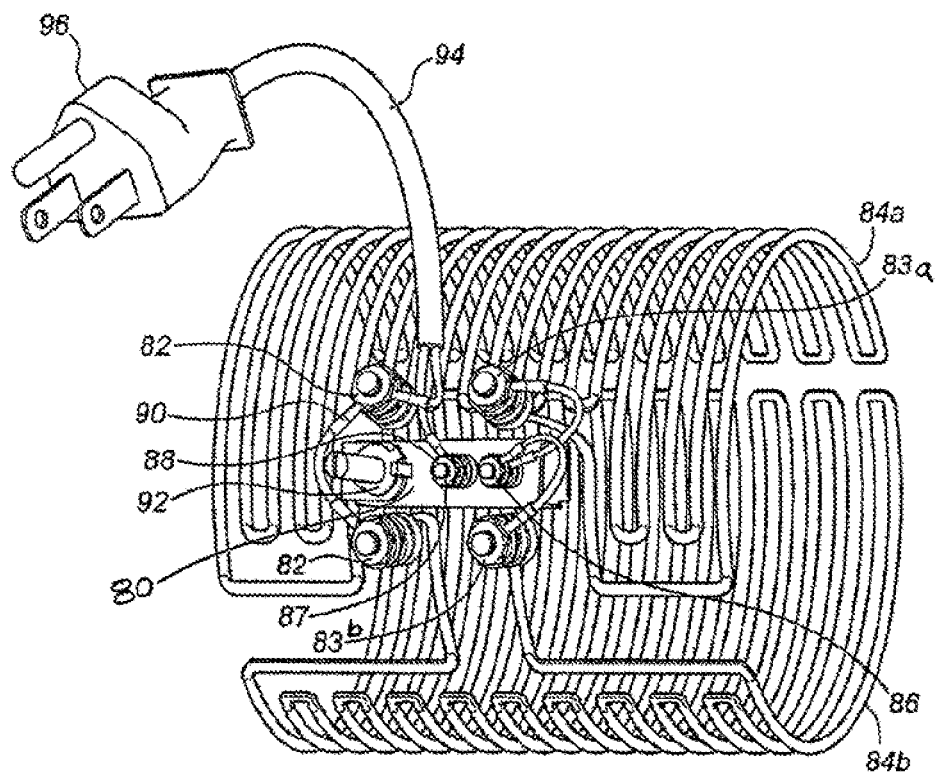
FIG. 5 is a perspective view depicting the heating coils of a heating collar.

In the illustrated embodiment shown in FIG. 5, heating coils 84a and 84b can be connected to connector terminals 82 and 83. Connectors 82 can couple to power neutral line 90. Connectors 83 can couple to terminal 86 on thermostat 80. Power line 88 can couple to terminal 87 on thermostat 80. In this embodiment, thermostat 80 can be configured to be disposed within the heating collar in opening 36 as shown in FIG. 2B and as described above. Power line 88 and neutral line 90 can be enclosed in cable 94 that can include power plug 96 located at a far end of cable 94 for plugging into an electrical power outlet (not shown). Thermostat control 92, as shown in this embodiment, can be a rotary control that can be used to set the desired temperature the heating collars are to heat a pipe to. It should be obvious to those skilled in the art that thermostat control 92 can be of any suitable type of control as used on thermostats.

In operation, thermostat 80 can close an internal electrical connection between terminals 86 and 87 (not shown) to allow electrical current to flow through heating coils 84a and 84b. As the heating coils heat the pipe, thermo couplers 80 can sense the temperature of the pipe. When the temperature of the pipe is approximately that of the preset temperature setting on thermostat control 92, thermostat 80 opens the electrical connection between terminals 86 and 87 to stop the flow of current through heating coils 84a and 84b thereby stopping the heating of the pipe beyond the preset temperature setting on thermostat control 92. As the pipe cools below the preset temperature, thermostat 80 can close the electrical connection between terminals 86 and 87 to commence heating of the pipe. As well known to those skilled in the art, this heating and cooling cycle can be repeated until electrical power is disconnected from the heating coils or until thermostat control 92 is adjusted to a new temperature setting whereby the heating and cooling cycle can adjust to the new temperature setting.

In some embodiments, the heating collar can omit thermostat 80 wherein neutral line 90 can couple to terminal 82 and power line 88 can couple to terminals 83a and 83b. This can be the case where the source of electrical is a nominal 110-120 VAC. In other embodiments, 220-240 VAC, 1-phase or 208 VAC, 3-phase electrical power can be the source of electrical power wherein terminals 83a and 83b can be coupled to separate terminals or phases of the source of electrical power.

Figure 6:
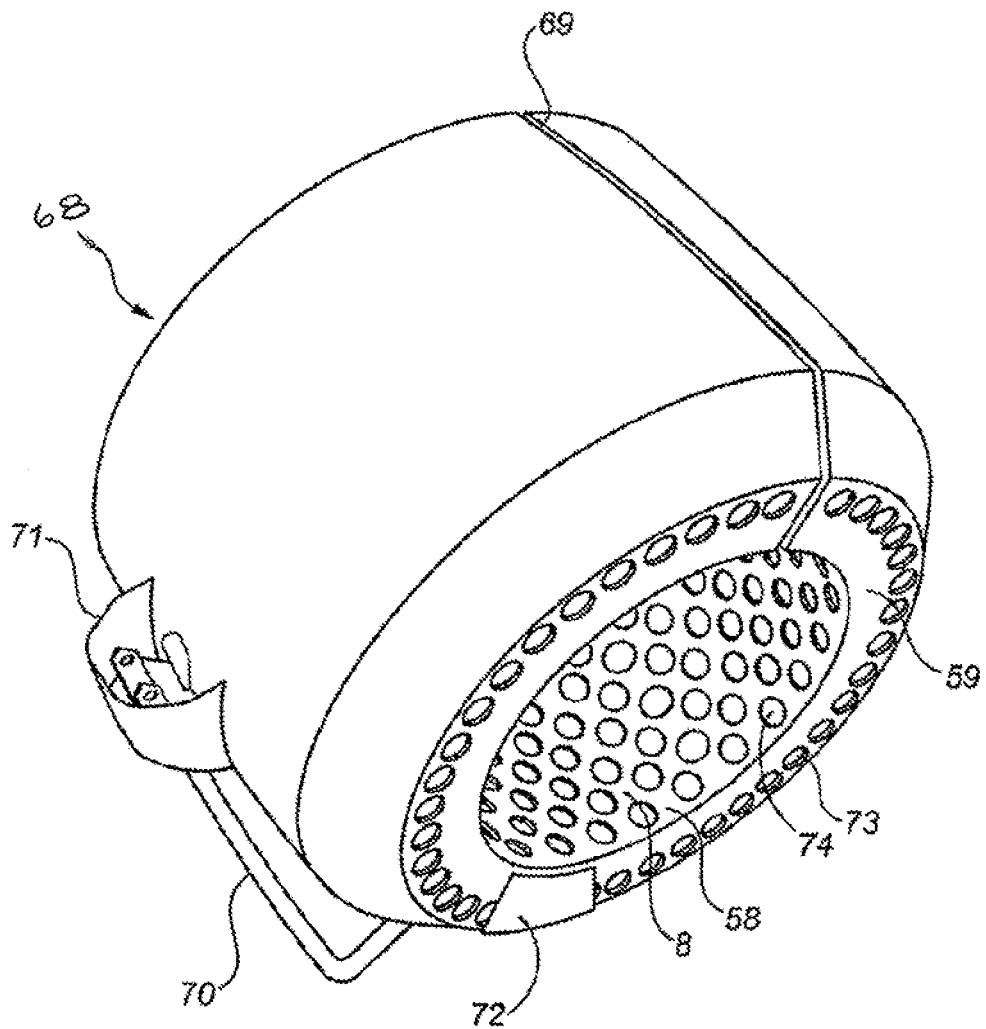
FIG. 6 is a perspective view depicting an alternate embodiment of a heating collar.

Referring to FIG. 6, an alternate embodiment of a heating collar is shown in a closed position. In some embodiments, heating collar 68 can have a hard shell outer covering and can be comprised of two portions or approximate halves joined together by hinge 69 that can allow collar 68 to be opened and placed onto a pipe, and then closing collar 68 around the pipe. Collar 68 can further comprise handle 70 disposed thereon. Handle 70 can be grasped by an operator to open and close collar 68. In other embodiments, collar 68 can comprise input voltage plug 71 disposed on the outer surface of collar 68. Clasp 72 disposed on collar 68 can be used to secure the collar halves together after collar 68 has been placed on a pipe. In some embodiments, ventilation holes 73 can be disposed on inside surface 58 to allow heat from heating element 74 to dissipate to the pipe. Ventilation holes 73 can also be disposed on sidewall 59 to allow air to circulate through collar 68. In other embodiments, collar 68 can omit voltage plug 71 and further comprise an electrical cable (not shown) entering collar 68 to provide a source of electrical power.

Figure 7:
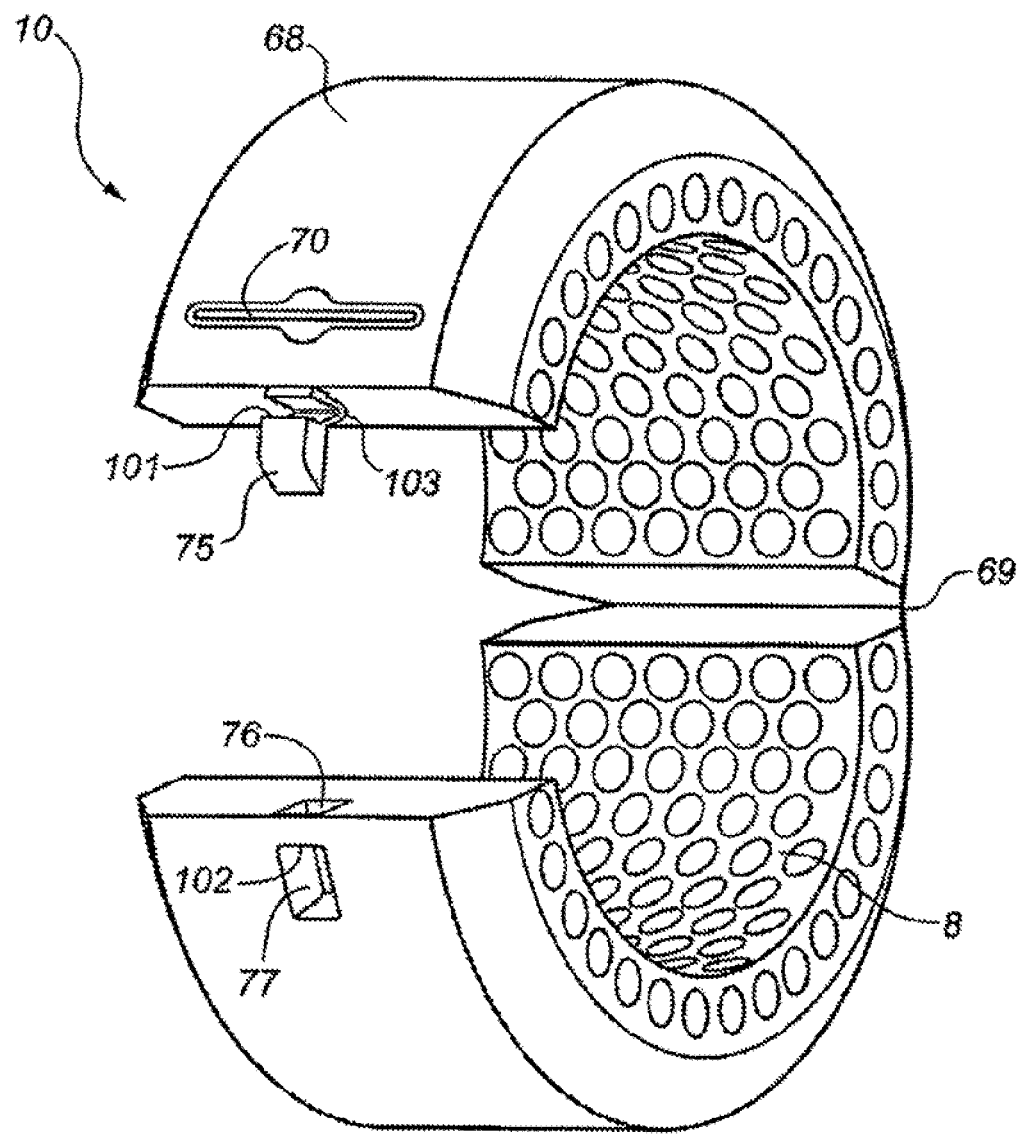
FIG. 7 is a perspective view depicting the heating collar of FIG. 6 in an open position and having a spring-loaded button fastening mechanism.

Referring to FIG. 7, collar 68 is shown in an open position. In this embodiment, collar 68 can have a fastening mechanism that can include spring-loaded button 75 disposed on an upper half of collar 68 via spring 103. Collar 68 can also include opening 76 disposed on a lower half of collar 68. When collar 68 is closed around a pipe, button 75 can be inserted into opening 76 until button 75 is fully seated in opening 77 whereby edge 101 of button 75 catches edge 102 of opening 77 to secure the collar halves together. The spring tension of spring 103 can keep button 75 seated in opening 77. To open collar 68, button 75 can be depressed so that edge 101 clears edge 102 thereby allowing button 75 to be pulled from opening 76 as collar 68 is opened.

Figure 8:
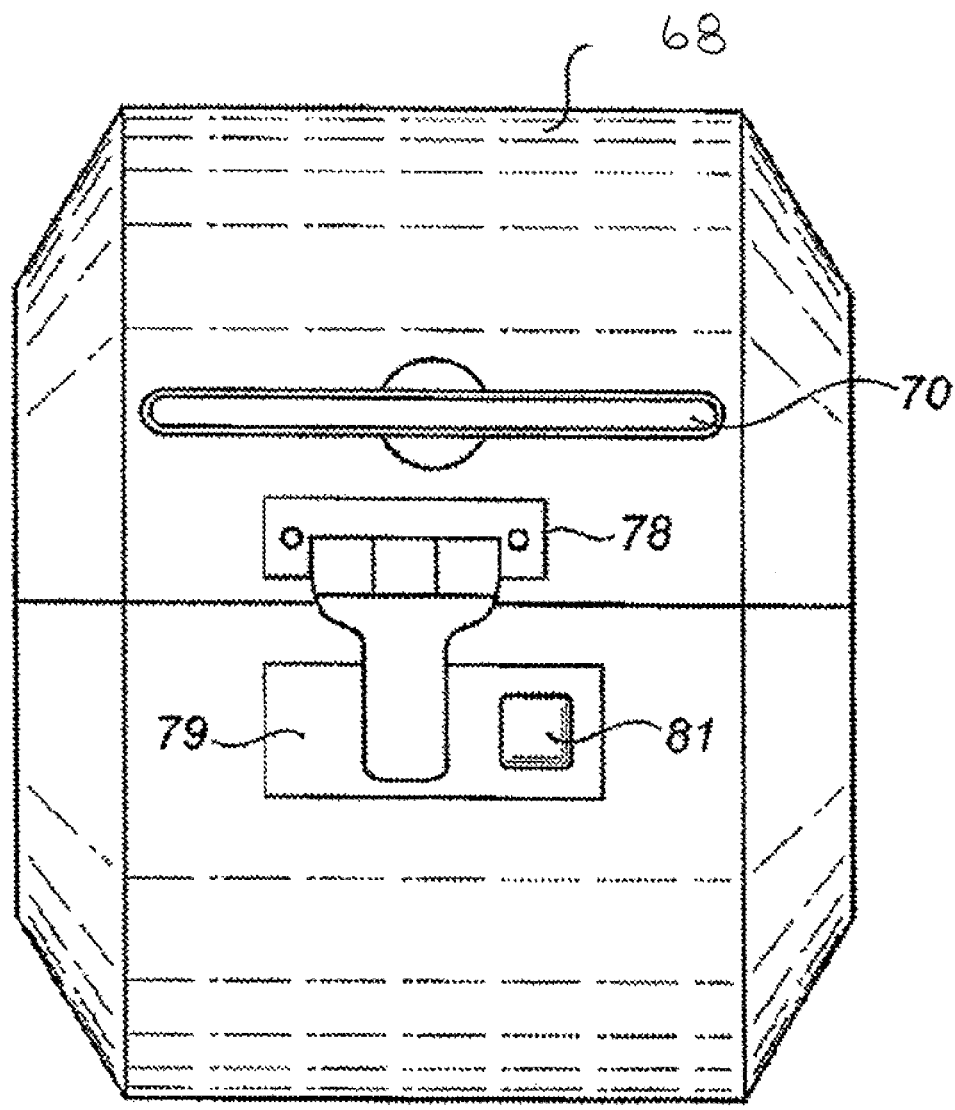
FIG. 8 is a front elevation view depicting the heating collar of FIG. 6 in a closed position and having a thumb-catch fastening mechanism.

Referring to FIG. 8, collar 68 is shown having an alternate fastening mechanism. In this embodiment, collar 68 can have a "briefcase-style latch" or "thumbcatch" comprising of spring-loaded latch clasp 78 and catch 79. To secure the halves of collar 68 together, clasp 78 can be inserted into and latched to catch 79. To open collar 68, release button 81 can be pushed in or pushed to one side to release clasp 78 from catch 79.

Figure 9A:
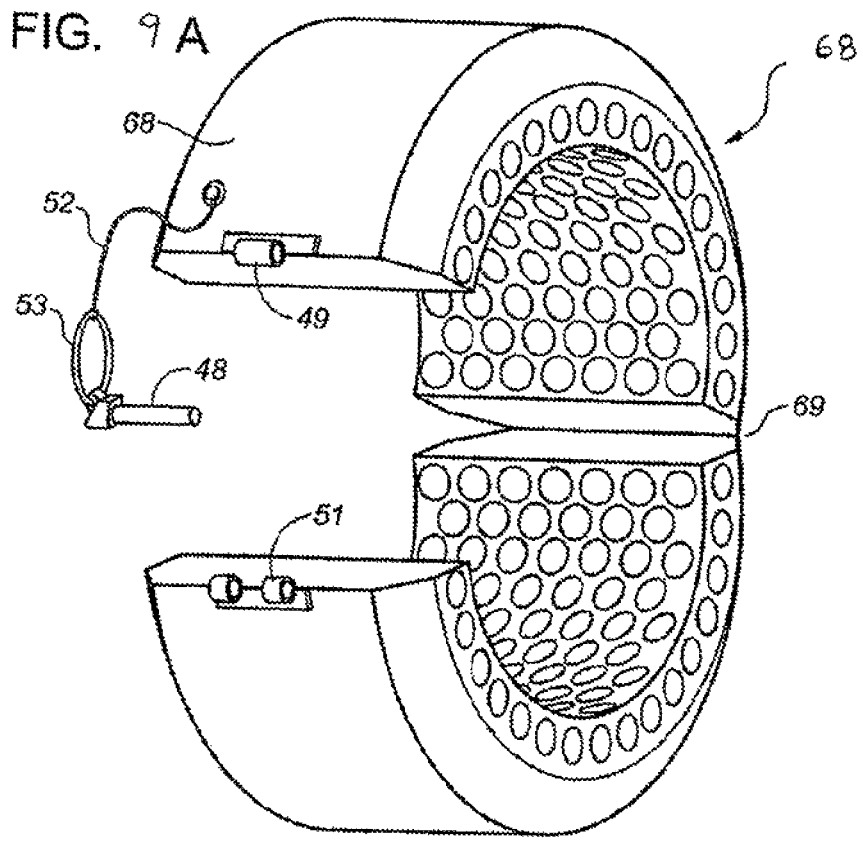
FIG. 9A is a perspective view depicting the heating collar of FIG. 6 in an open position and having a lynch pin fastening mechanism.
Figures 9B, 9C:
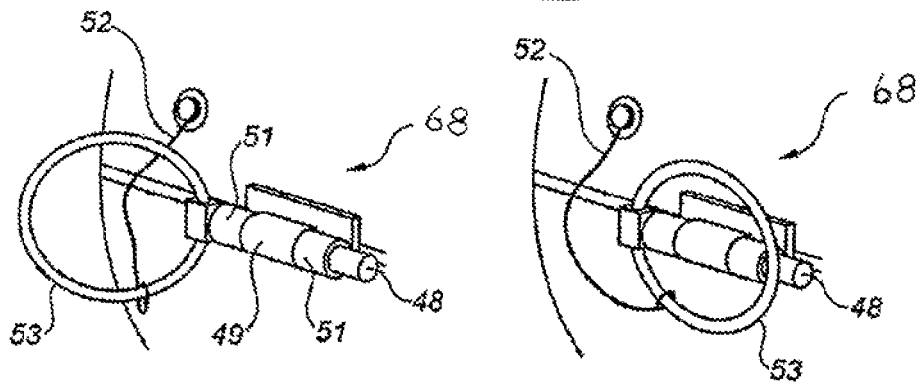
FIG. 9B is a perspective view depicting the heating collar of FIG. 9A with the lynch pin inserted.
FIG. 9C is a perspective view depicting the heating collar of FIG. 9A with the lynch pin fully inserted.

Referring to FIGS. 9A to 9C, collar 68 is shown having a further alternative fastening mechanism comprising of pin loops 49 and 51 disposed on the upper and lower collar halves, respectively, and lynch pin 48. In FIG. 9A, collar 68 is shown in an open position. In FIG. 9B, collar 68 is shown in a closed position with loop 49 disposed between loops 51 and lynch pin 48 inserted through loops 49 and 51 to secure the collar halves together. In FIG. 9C, spring-loaded ring 53 is shown closed against lynch pin 48 to keep lynch pin 48 from sliding out of loops 49 and 51. In some embodiments, lynch pin 48 can be attached to collar 68 with line 52 having one end attached to collar 68 and the other end attached to ring 53. Line 52 can be a monofilament or stranded string or cable of suitable material as obvious to a person skilled in the art.

Figure 10:
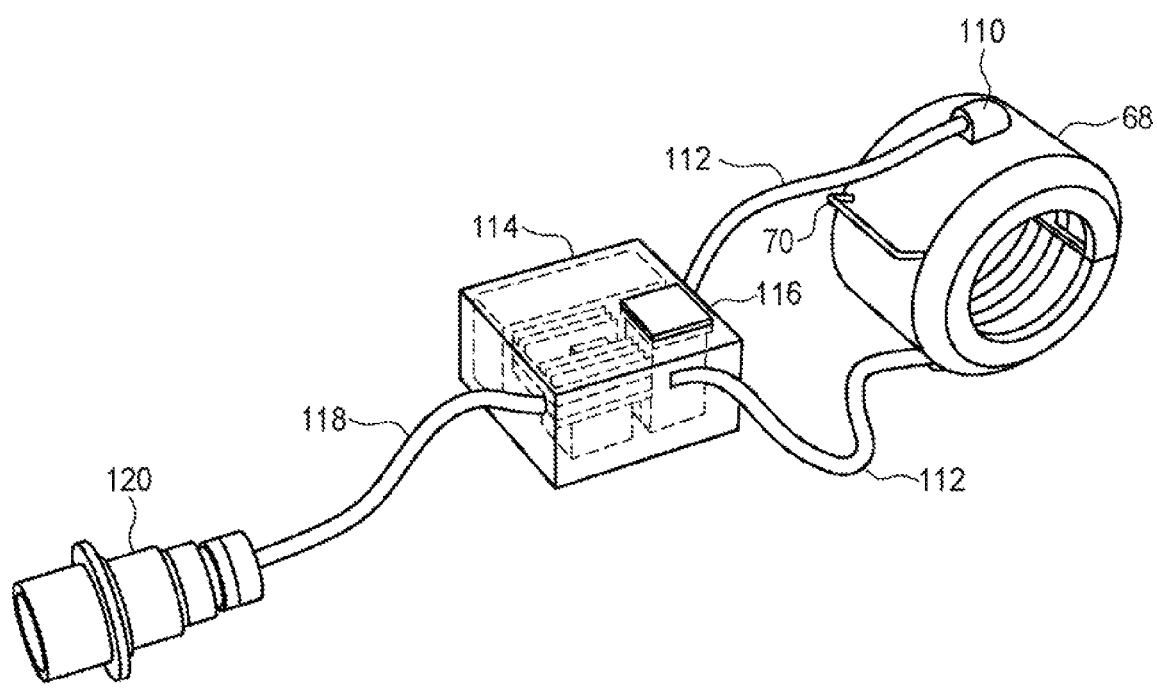
FIG. 10 is a perspective view depicting a heating apparatus with a programmable temperature controller.
Figure 11:
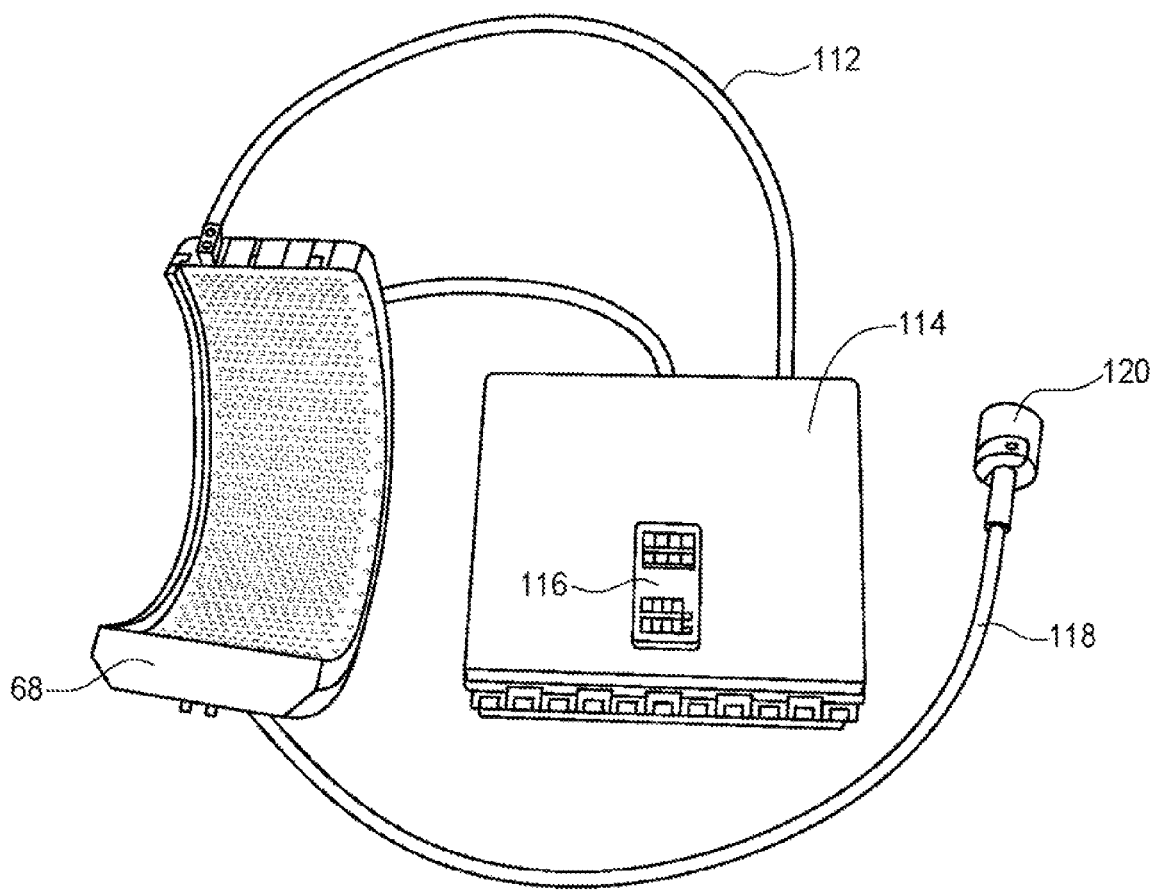
FIG. 11 is a top plan view depicting the apparatus of FIG. 10.

Referring to FIGS. 10 and 11, an embodiment of a heating collar and control unit is shown. In some embodiments, the apparatus can comprise at least one heating collar 68 that can be supplied power from control unit 114. Electrical cables 112 can provide electrical power from control unit 114 to collar 68, wherein cables 112 can enter collar 68 through strain relief couplers 110.

Figure 12:
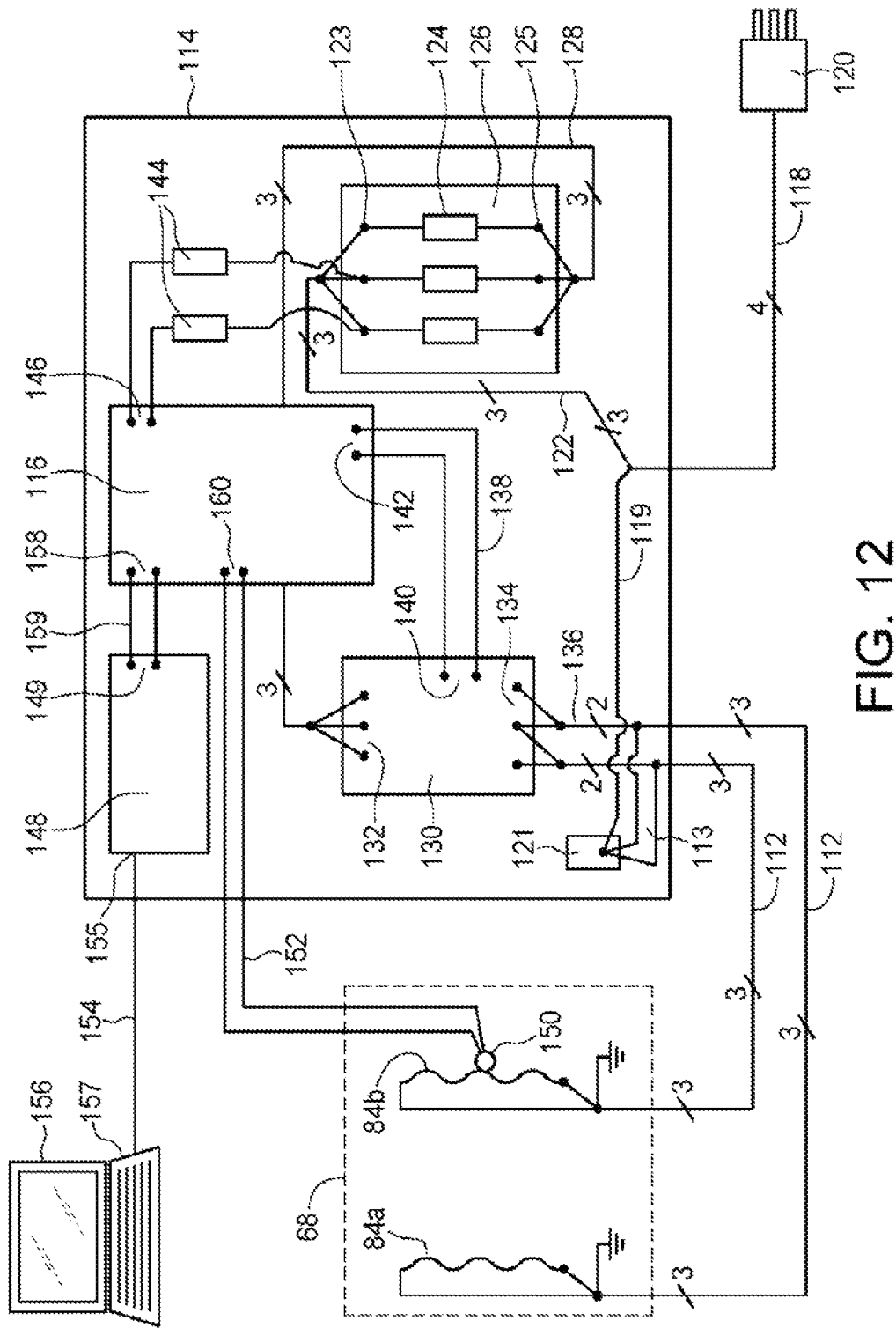
FIG. 12 is a block diagram depicting an electric schematic of the circuit of the apparatus of FIG. 11.

Referring to FIG. 12, a block diagram of some embodiments of the apparatus is shown. In some embodiments, control unit 114 can comprise digital controller 116, contactor 130 and fuse block 126. Representative examples of digital controller 116 can include the DC1000 series of digital controllers as manufactured by Honeywell International Inc. of Morristown, N.J., U.S.A., however, it is obvious to those skilled in the art that any functionally equivalent digital programmable temperature controller can be used.

Digital controller 116 can be operatively coupled to contactor 130 via control wires 138 running between terminals 142 disposed on digital controller 116 and terminals 140 disposed on contactor 130 wherein digital controller 116 can operate contactor 130 on and off to supply electrical power to heating coils 84a and 84b disposed in collar 68. For the purposes of this specification, the term "contactor" can include contactors, electro-mechanical relays, triacs, semiconductor devices or any other functionally equivalent mechanical, electro-mechanical or solid states devices that can turn on and off the flow of electrical current passing there through, as well known to those skilled in the art. In a representative embodiment, contactor 130 can comprise a 3-phase contactor configured to pass 30 amps of electrical current per each phase, and can further comprise a 208-240 VAC operating coil that can be controlled by digital controller 116. Electrical power can be provided to contactor 130 by cable 118 connected to a source of electrical power via connector 120.

In the illustrated embodiment, connector 120 can connect to a source of 208 VAC, 3-phase power wherein cable 118 can comprise a 10/4 (4 conductors of 10-gauge insulated wires) cable. Three of the conductors of cable 118 can be connected to each of the 3 phases of electrical power and the fourth can be ground conductor 119 connected to ground connection tab 121 disposed in unit 114. In some embodiments, the electrical power supplied through cable 118 via conductors 122 can be first coupled to terminals 123 of fuses 124, one fuse for each phase, disposed on fuse block 126. In the illustrated embodiment, fuses 124 can comprise a 30-amp, 240-volt rating. The electrical power can then pass from terminals 125 of fuses 124 through wires 128 and couple to input terminals 132 disposed on contactor 130. Wires 136 of cables 112 can be coupled to output terminals 134 disposed on contactor 130 to supply power to heating coils 84a and 84b disposed in collar 68.

In a representative embodiment, cables 112 can comprise 10/3 (3 conductors of 10-gauge insulated wires) cable, wherein two conductors of each of cable 112 can be coupled to terminals 134, and the third conductor of each cable 112 can be ground conductors 113 coupled to ground connection tab 121.

In some embodiments, electrical power can be supplied to digital controller 116 by wires connecting power terminals 146 disposed on digital controller 116 to terminals 123. In other embodiments, the electrical power supplied to digital controller 116 can pass through fuses 144.

In some embodiments, unit 114 can further comprise thermocouple 150 disposed in collar 68 to measure temperature within collar 68 when heating a pipe. Thermocouple 150 can comprise a positive temperature coefficient resistor, a negative temperature coefficient resistor, a semiconductor device or any other functionally equivalent device as well known to those skilled in the art. Thermocouple 150 can be coupled to digital controller 116 via control wires 152 coupled to thermocouple input terminals 160 disposed on digital controller 116. Wires 152 can be disposed in a separate cable running between unit 114 and collar 68 or they can be disposed or bundled in one or both of cables 112. In the illustrated embodiment, thermocouple is shown disposed by heating coil 84b although it is obvious to those skilled in the art that one or more thermocouples 150 can be disposed in collar 68, either proximal to one or both of heating coils 84a and 84b or in a location in collar 68 where the temperature therein can be measured.

In some embodiments, unit 114 can further comprise data logger 148 disposed therein and operatively connected to digital controller 116 by wires 159 connecting data-out terminals 158 disposed on digital controller 116 to data-in terminals 149 disposed on data logger 148. Data logger 148 can be configured to record the temperature sensed by thermocouple 150 disposed in collar 68 over time during a heating operation of a pipe or weld joint, and store the recorded temperature as a temperature reading in a computer-readable memory disposed in data logger 148. The temperature reading can further comprise the time the temperature reading was recorded by data logger 148. A representative example of a suitable data logger can be the model no. OM-CP-TC110-2 MB Thermocouple Recorder as manufactured by Omega Engineering, Inc. of Stamford, Conn., U.S.A. or the model no. EL-USB-TC-LCD data logger as manufactured by Lascar Electronics Inc. of Erie, Pa., U.S.A. although it is obvious to those skilled in the art that any suitable and functionally equivalent data-logging device can be used as data logger 148.

In some embodiments, data logger 148 can be further configured to connect to computer 156 via data cable 154 connecting terminal 155 disposed on data logger 148 to terminal 157 disposed on computer 156. Terminals 155 and 157 can be Universal Serial Bus ("USB") or RS-232 serial communication connection terminals, as well known to those skilled in the art, or any other functionally equivalent data connector devices or standards. One or both of data logger 148 and computer 156 can further comprise computer firmware or software, as the case may be, to transfer the recorded temperature readings logged by data logger 148 to computer 156 to create an electronic record of a heating operation performed on a pipe or weld joint. Such electronic records can be used to verify that a particular pipe or weld joint has received a heating operation.

In operation, in some embodiments, digital controller 116 can control the electrical power supplied to collar 68, wherein a pipe or weld joint being heated by collar 68 can be heated to one or more predetermined temperatures over one or more predetermined periods of time.

In some embodiments, digital controller 116 can be programmed to supply electrical power to collar 68 such that the pipe or weld joint can be heated to a predetermined temperature wherein the temperature can be increased or decreased over a predetermined period of time in addition to keeping the pipe or weld joint at predetermined temperature for a predetermined period of time.

For example, a pre-heating operation of a pipe prior to welding can comprise heating the pipe to approximately 250° F. for approximately 30 minutes. A hydrogen bake-out operation of a weld joint can comprise heating the weld joint to approximately 200° F. for approximately 1.5 hours. A stress test of a weld joint can comprise raising the temperature of the weld joint to approximately 1100° F. over approximately 30 minutes, keeping the temperature at approximately 1100° F. for approximately 2 to 4 hours and then decreasing the temperature to room or atmospheric temperature over approximately 30 minutes. A post weld treatment operation of a pipe after welding can comprise first heating the pipe to approximately 200° F. and then heating the pipe to 1150° F. over a period of approximately 30 minutes and then holding the pipe at this temperature for approximately 2 to 4 hours followed by a 30 minute cool-down period to 200° F., or as specified by code.

The selection of the temperature and heating period to be applied to a pipe or weld joint can be a function of the material or materials that comprise the pipe or weld joint, the manufacturer's specifications for the pipe or weld material, or of the operating conditions of the pipe or weld joint is expected to operate under. The apparatus can be configured to be programmed by a user to provide any form of heating program comprising of temperature and heating period for the pipe or weld joint.

In the illustrated embodiment shown in FIG. 12, unit 114 is shown configured to operate with 208 VAC, 3-phase electrical power. As collar 68 is shown comprising two heating coils, it is obvious to those skilled in the art that the apparatus is being operating in an "open delta" configuration, meaning that a load is being placed on only 2 of the 3 phases of the electrical power. If two or more units 114 are being operated using the same source of 3-phase electrical power, it is obvious to those skilled in the art that each of units 114 can be configured to couple the heating coils to different phases of the electrical power wherein the total load being placed on the 3-phase electrical power by two or more units 114 can be shared or balanced as best as possible. One method of achieving balance between two or more units 114 is to change the phases of the electrical power supplied to the heating coils on different units 114. This can be accomplished by re-arranging the order in which the power conductors disposed in cable 118 are connected to each of the 3-phase power connection terminals disposed in connector 120. As there are different ways to connect the conductors in cable 118 to the 3-phase power connection terminals in connector 120, unit 114 can be configured as 3 different types (for example, "Type 1", "Type 2" or "Type 3") depending on the order the power conductors of cable 118 are connected to the power connection terminals disposed in connector 120, as well known to those skilled in the art, as a means to balance the load placed on the source of 3-phase electrical power when two or more units 114 are being used and connected to the same source of electrical power. For example, when 2 units 114, are being used, a Type 1 unit and a Type 2 (or 3) unit can be used. When a third unit 114 is being used, a Type 3 (or 2) unit can be added. The cycle can continue if further units 114 are being use.

It is obvious to those skilled in the art that, in some embodiments, heating collar 68 can comprise three heating coils so as to provide a balanced or "closed delta" load on a source of 3-phase electrical power. In so doing, the need for provided different "types" of units 114, as described above, become diminished or eliminated when multiple units 114 are being used concurrently as each unit 114 can provide a fully balanced load on the 3-phase electrical power.

It is also obvious to those skilled in the art that unit 114 can be configured to supply 220-240 VAC, 1-phase electrical power to collar 68 wherein each 110-120 VAC leg or terminal of the electrical power can power one of heating coils 84a and 84b disposed in collar 68. It is also obvious to those skilled in the art that unit 114 can be configured to be coupled to, and supply electrical power to collar 68 from, a source of electrical power of a voltage greater than 208 VAC, 3-phase or 220-240 VAC, 1-phase. In such configurations, each of digital controller 116, fuses 125 and 144, and contactor 130 can be adapted or substituted with comparable components that are capable of operating at different voltages and currents to accomplish the same or similar function.

Although a few illustrative embodiments have been shown and described, those skilled in the art will appreciate that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A heating apparatus for heating a metal pipe or a metal pipe weld joint, comprising:
    a) at least one heating collar configured for being disposed around the pipe or weld joint, the at least one heating collar configured for pre-heating the metal pipe to a prior welding temperature or for heating the metal pipe weld joint to a hydrogen bake out temperature, to a stress test temperature or to a post weld treatment temperature;
    b) a controller unit configured for connecting to a source of electrical power, the controller unit operatively coupled to the at least one heating collar and further configured for controlling the supply of electrical power to at least one heating collar;

c) a contactor disposed in the controller unit for controlling the supply of electrical power to the at least one heating collar; and d) a digital controller disposed in the controller unit configured for turning the contactor on and off, the digital controller further comprising a program for turning the contactor on and off at predetermined times wherein the at least one heating collar can heat the pipe or weld joint at the predetermined times.

2. The heating apparatus as set forth in claim 1, wherein the at least one heating collar further comprises:

a) a resistance wire network which is capable of creating thermal heat energy when voltage is applied across the wire network;

b) an inner core configured to be contiguous with the pipe or weld joint, to absorb the thermal heat energy from the network and to transfer the thermal heat energy to the pipe or weld joint; and c) a protective layer providing a protective outer covering for supporting and protecting the least one heating collar from the external environment, the protective layer further comprising fastening means for securing each collar securely around the pipe or weld jointing.

3. The heating apparatus as set forth in claim 1, wherein the at least one heating collar further comprises a heat transfer element, the heat transfer element contiguous with the inner core and configured to transfer thermal heat energy from the inner core to the pipe or weld joint.

4. The heating apparatus as set forth in claim 3, wherein the at least one heating collar further comprises an outer cover, the outer cover providing a thermally conductive heat transfer substrate for transferring thermal heat energy from the inner core to the pipe or weld joint.

5. The heating apparatus as set forth in claim 4, wherein the at least one heating collar further comprises an insulating layer, the insulating layer provides a heat insulating layer for protecting the hands of a welding operator from direct thermal contact with the heat transfer element.

6. The heating apparatus as set forth in claim 1, wherein the controller unit further comprises an electrical power cable having a electrical power connector for connecting to the source of electrical power.

7. The heating apparatus as set forth in claim 6, wherein the source of electrical power comprises a voltage in the range of approximately 208 VAC to 240 VAC.

8. The heating apparatus as set forth in claim 2, wherein the fastening means comprises a first end and a second end disposed on the protective layer, the first end comprising a Velcro™ tab secured to a distal end of the protective layer, and the second end secured to a proximal end of the protective layer, the second end comprising a Velcro receiving end for receiving the Velcro™ tab of the distal end for fastening the at least one heating collar around the circumference of the pipe or weld joint.

9. The heating apparatus as set forth in claim 2, wherein the protective outer covering further comprises a hard shell, the hard shell further comprising two portions or halves hinged together.

10. The heating apparatus as set forth in claim 9, wherein the fastening means further comprises one or more of the group consisting of a spring-loaded button disposed on one portion or half and an opening for the button disposed on the other portion or half, a thumb-catch disposed on the hard shell portions or halves, and a lynch pin and pin loops disposed on the hard shell portions or halves.

11. The heating apparatus as set forth in claim 1, further comprising a thermocouple disposed in the at least one heating collar, the thermocouple configured to measure temperature in the at least one heating collar during a heating operation of the pipe or weld joint, the thermocouple operatively coupled to the digital controller wherein the digital controller is configured for turning the contactor on and off in response to the temperature measured by the thermocouple to heat the pipe or weld joint to predetermined temperatures at the predetermined times.

12. The heating apparatus as set forth in claim 11, further comprising a data logger disposed in the controller unit, the data logger operatively connected to the digital controller, the data logger configured to record at least one temperature reading corresponding to the temperature in the at least one heating collar during the heating operation, the at least one temperature reading comprising the time when the at least one temperature reading occurs.

13. The heating apparatus as set forth in claim 12, further comprising a computer configured for operatively connecting to the data logger and for retrieving the at least one temperature reading recorded by the data logger during the heating operation from the data logger.

14. A method for heating a metal pipe or a metal pipe weld joint, the method comprising the steps of:

a) providing a heating apparatus, comprising:

i) at least one heating collar configured for being disposed around the pipe or weld joint, the at least one heating collar configured for pre-heating the metal pipe to a prior welding temperature or for heating the metal pipe weld joint to a hydrogen bake out temperature, to a stress test temperature or to a post weld treatment temperature, ii) a controller unit configured for connecting to a source of electrical power, the controller unit operatively coupled to the at least one heating collar and further configured for controlling the supply of electrical power to at least one heating collar, iii) a contactor disposed in the controller unit for controlling the supply of electrical power to the at least one heating collar, and iv) a digital controller disposed in the controller unit configured for turning the contactor on and off, the digital controller further comprising a program for turning the contactor on and off at predetermined times wherein the at least one heating collar can heat the pipe or weld joint at the predetermined times;

b) placing the heating apparatus around the pipe or weld joint;

c) connecting the heating apparatus to the source of electrical power; and d) turning on the heating apparatus wherein the pipe or weld joint is heated.

15. The method as set forth in claim 14, wherein the at least one heating collar further comprises:

a) a resistance wire network which is capable of creating thermal heat energy when voltage is applied across the wire network;

b) an inner core configured to be contiguous with the pipe or weld joint, to absorb the thermal heat energy from the network and to transfer the thermal heat energy to the pipe or weld joint; and c) a protective layer providing a protective outer covering for supporting and protecting the least one heating collar from the external environment, the protective layer further comprising fastening means for securing each collar securely around the pipe or weld jointing.

16. The method as set forth in claim 14, wherein the at least one heating collar further comprises a heat transfer element, the heat transfer element contiguous with the inner core and configured to transfer thermal heat energy from the inner core to the pipe or weld joint.

17. The method as set forth in claim 16, wherein the at least one heating collar further comprises an outer cover, the outer cover providing a thermally conductive heat transfer substrate for transferring thermal heat energy from the inner core to the pipe or weld joint.

18. The method as set forth in claim 17, wherein the at least one heating collar further comprises an insulating layer, the insulating layer provides a heat insulating layer for protecting the hands of a welding operator from direct thermal contact with the heat transfer element.

19. The method as set forth in claim 14, wherein the controller unit further comprises an electrical power cable having a electrical power connector for connecting to the source of electrical power.

20. The method as set forth in claim 19, wherein the source of electrical power comprises a voltage in the range of approximately 208 VAC to 240 VAC.

21. The method as set forth in claim 14, wherein the heating apparatus further comprises a thermocouple disposed in the at least one heating collar, the thermocouple configured to measure temperature in the at least one heating collar during the heating of the pipe or weld joint, the thermocouple operatively coupled to the digital controller wherein the digital controller is configured for turning the contactor on and off in response to the temperature measured by the thermocouple to heat the pipe or weld joint to predetermined temperatures at the predetermined times.

22. The method as set forth in claim 21, further comprising the steps of heating the pipe or weld joint to at least one predetermined temperature for a predetermined period of time during the heating of the pipe or weld joint.

23. The method as set forth in claim 21, wherein the heating apparatus further comprises a data logger disposed in the controller unit, the data logger operatively connected to the digital controller, the data logger configured to record at least one temperature reading corresponding to the temperature in the at least one heating collar during the heating of the pipe or weld joint, the at least one temperature reading comprising the time when the at least one temperature reading occurs.

24. The method as set forth in claim 23, wherein the heating apparatus further comprises a computer configured for operatively connecting to the data logger and for retrieving the at least one temperature reading recorded by the data logger during the heating of the pipe or weld joint from the data logger.

25. The method as set forth in claim 24, further comprising the step of retrieving the at least one temperature reading recorded by the data logger during the heating of the pipe or weld joint.

* * * * *